United States Patent
Shinya et al.

(10) Patent No.: US 9,423,638 B2
(45) Date of Patent: *Aug. 23, 2016

(54) RESIN COMPOSITION AND DISPLAY UNIT

(75) Inventors: Yoshihisa Shinya, Tochigi (JP); Yusuke Kamata, Tochigi (JP)

(73) Assignee: DEXERIALS CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/308,858

(22) PCT Filed: Jul. 17, 2007

(86) PCT No.: PCT/JP2007/064120
§ 371 (c)(1),
(2), (4) Date: Dec. 24, 2008

(87) PCT Pub. No.: WO2008/007800
PCT Pub. Date: Jan. 17, 2008

(65) Prior Publication Data
US 2009/0296033 A1    Dec. 3, 2009

(30) Foreign Application Priority Data

Jul. 14, 2006  (JP) ................... 2006-193730
Apr. 9, 2007  (JP) ................... 2007-102251

(51) Int. Cl.
*G02F 1/1333* (2006.01)
*C08F 290/06* (2006.01)
(Continued)

(52) U.S. Cl.
CPC ............ *G02F 1/1333* (2013.01); *C08F 290/06* (2013.01); *C09J 109/00* (2013.01); *C09J 133/066* (2013.01); *G02F 1/133308* (2013.01);
(Continued)

(58) Field of Classification Search
CPC ............. G02F 1/1333; G02F 1/13308; G02F 2001/133331; G02F 2201/503
See application file for complete search history.

(56) References Cited

U.S. PATENT DOCUMENTS 5,073,477 A    12/1991  Kusuda et al.
5,926,248 A *   7/1999  Tucker ........................ 351/44
(Continued)

FOREIGN PATENT DOCUMENTS

CN    1502048 A    6/2004
CN    1788041 A    6/2006
(Continued)

OTHER PUBLICATIONS

Mar. 22, 2010 Search Report issued in European Patent Application No. 07790882.0.
(Continued)

*Primary Examiner* — Jessica M Merlin
(74) *Attorney, Agent, or Firm* — Oliff PLC

(57) ABSTRACT

A thin display unit that incorporates a high-luminance, high-contrast display part that is free of image detects caused by the deformation of the display part is provided. The display unit of the present invention includes an image display part 2 and a light-transmitting protective part 3 arranged on the image display part 2. A cured resin layer 5 is arranged between the display part 2 and the protective part 3. The cured resin layer 5 has a transmittance of 90% or higher in the visible range and a storage modulus at 25° C. of 1×10⁷ Pa or less. The cured resin layer 5 is formed from a resin composition that has a cure shrinkage of 5% or less.

8 Claims, 2 Drawing Sheets

1

(51) Int. Cl.
*C09J 109/00* (2006.01)
*C09J 133/06* (2006.01)
*C08L 9/00* (2006.01)
*C08L 19/00* (2006.01)
*C08L 45/00* (2006.01)
*C08L 51/04* (2006.01)

(52) U.S. Cl.
CPC ............... *C08L 9/00* (2013.01); *C08L 19/006* (2013.01); *C08L 45/00* (2013.01); *C08L 51/04* (2013.01); *G02F 2001/133331* (2013.01); *G02F 2201/50* (2013.01); *G02F 2201/503* (2013.01); *G02F 2202/022* (2013.01); *Y10T 428/24355* (2015.01); *Y10T 428/31504* (2015.04)

(56) References Cited

U.S. PATENT DOCUMENTS

| | | | | |
|---|---|---|---|---|
| 6,204,896 | B1 * | 3/2001 | Matsuhira et al. | 349/12 |
| 6,287,745 | B1 * | 9/2001 | Yamamura et al. | 430/269 |
| 6,950,236 | B2 * | 9/2005 | Hokazono et al. | 359/586 |
| 7,830,595 | B2 | 11/2010 | Hinata et al. | |
| 7,910,033 | B2 * | 3/2011 | Kamata | G02F 1/133308 156/275.5 |
| 7,927,533 | B2 * | 4/2011 | Kamiya | G02F 1/133308 156/275.5 |
| 2003/0118922 | A1 * | 6/2003 | Hayashi et al. | 430/7 |
| 2003/0199601 | A1 | 10/2003 | Chang et al. | |
| 2005/0126697 | A1 | 6/2005 | Kuczynski | |
| 2006/0062938 | A1 * | 3/2006 | Takeko et al. | 428/1.55 |
| 2006/0159867 | A1 | 7/2006 | O'Donnell | |
| 2006/0234074 | A1 | 10/2006 | Yun et al. | |
| 2007/0065091 | A1 | 3/2007 | Hinata et al. | |
| 2009/0128767 | A1 | 5/2009 | Suezaki et al. | |
| 2009/0162645 | A1 | 6/2009 | Matsuhira | |
| 2009/0283211 | A1 | 11/2009 | Matsuhira | |
| 2009/0296033 | A1 | 12/2009 | Shinya et al. | |

FOREIGN PATENT DOCUMENTS

| | | |
|---|---|---|
| CN | 1936663 | 3/2007 |
| CN | 101681571 B | 3/2013 |
| EP | 1 634 910 A1 | 3/2006 |
| EP | 2 051 227 A1 | 4/2009 |
| JP | A-02-165188 | 6/1990 |
| JP | A-03-204616 | 9/1991 |
| JP | A-6-75701 | 3/1994 |
| JP | A-06-075701 | 3/1994 |
| JP | A-6-299126 | 10/1994 |
| JP | A-06-337411 | 12/1994 |
| JP | A-07-013173 | 1/1995 |
| JP | 7-64282 | 3/1995 |
| JP | A-08-122759 | 5/1996 |
| JP | A-08-160407 | 6/1996 |
| JP | A-08-211353 | 8/1996 |
| JP | A-08-220554 | 8/1996 |
| JP | A-08-328023 | 12/1996 |
| JP | A-09-087593 | 3/1997 |
| JP | A-9-274536 | 10/1997 |
| JP | A-09-318932 | 12/1997 |
| JP | A-10-81956 | 3/1998 |
| JP | A-10-083247 | 3/1998 |
| JP | A-10-095967 | 4/1998 |
| JP | 10168424 A * | 6/1998 ............ C09J 201/00 |
| JP | A-10-293314 | 11/1998 |
| JP | A-2000-73025 | 3/2000 |
| JP | 2000-111908 A | 4/2000 |
| JP | A-2000-219868 | 8/2000 |
| JP | A-2000-258780 | 9/2000 |
| JP | A-2000-267118 | 9/2000 |
| JP | A-2000-284700 | 10/2000 |
| JP | A-2001-37868 | 2/2001 |
| JP | 2007-102251 | 4/2001 |
| JP | A-2001-141907 | 5/2001 |
| JP | B2-3220403 | 8/2001 |
| JP | A-2002-19013 | 1/2002 |
| JP | A-2002-52552 | 2/2002 |
| JP | A-2002-92957 | 3/2002 |
| JP | A-2002-258268 | 9/2002 |
| JP | A-2002-528298 | 9/2002 |
| JP | A-2002-309199 | 10/2002 |
| JP | A-2002-323861 | 11/2002 |
| JP | A-2002-348150 | 12/2002 |
| JP | A-2002-543545 | 12/2002 |
| JP | A-2003-003150 | 1/2003 |
| JP | A-2003-29644 | 1/2003 |
| JP | 2003-096425 A | 4/2003 |
| JP | A-2003-096425 | 4/2003 |
| JP | A-2003-150065 | 5/2003 |
| JP | A-2003-207790 | 7/2003 |
| JP | 2003-295780 A | 10/2003 |
| JP | 2004-029711 A | 1/2004 |
| JP | A-2004-9665 | 1/2004 |
| JP | A-2004-077887 | 3/2004 |
| JP | A-2004-115757 | 4/2004 |
| JP | A-2004-117545 | 4/2004 |
| JP | A-2004-169023 | 6/2004 |
| JP | A-2004-170907 | 6/2004 |
| JP | A-2004-212521 | 7/2004 |
| JP | A-2004-224855 | 8/2004 |
| JP | A-2004-256595 | 9/2004 |
| JP | A-2004-271935 | 9/2004 |
| JP | A-2004-279946 | 10/2004 |
| JP | A-2004-325788 | 11/2004 |
| JP | A-2004-359769 | 12/2004 |
| JP | A-2005-23315 | 1/2005 |
| JP | A-2005-55641 | 3/2005 |
| JP | A-2005-76017 | 3/2005 |
| JP | A-2005-154581 | 6/2005 |
| JP | A-2005-179481 | 7/2005 |
| JP | A-2005-225127 | 8/2005 |
| JP | A-2005-234129 | 9/2005 |
| JP | 3327423 | 10/2005 |
| JP | A-2005-283749 | 10/2005 |
| JP | A-2005-314687 | 11/2005 |
| JP | A-2005-315901 | 11/2005 |
| JP | A-2006-11212 | 1/2006 |
| JP | A-2006-053425 | 2/2006 |
| JP | A-2006-053531 | 2/2006 |
| JP | A-2006-58753 | 3/2006 |
| JP | A-2006-058753 | 3/2006 |
| JP | 2006-113435 A | 4/2006 |
| JP | 2006-129678 A | 5/2006 |
| JP | A-2006-150755 | 6/2006 |
| JP | A-2006-154758 | 6/2006 |
| JP | A-2006-159412 | 6/2006 |
| JP | 2006-193730 | 7/2006 |
| JP | A-2006-189715 | 7/2006 |
| JP | A-2006-221187 | 8/2006 |
| JP | A-2006-267502 | 10/2006 |
| JP | A-2006-276105 | 10/2006 |
| JP | A-2006-277828 | 10/2006 |
| JP | A-2006-282911 | 10/2006 |
| JP | A-2006-292993 | 10/2006 |
| JP | 2006-298964 A | 11/2006 |
| JP | A-2006-308866 | 11/2006 |
| JP | A-2006-342222 | 12/2006 |
| JP | 2007-010769 | 1/2007 |
| JP | A-2007-009115 | 1/2007 |
| JP | 2007-041534 A | 2/2007 |
| JP | A-2007-023147 | 2/2007 |
| JP | 2007-077321 A | 3/2007 |
| JP | 2007-102252 | 4/2007 |
| JP | A-2007-108592 | 4/2007 |
| JP | A-2007-114737 | 5/2007 |
| JP | A-2007-140220 | 6/2007 |
| JP | A-2007-156066 | 6/2007 |
| JP | 2007-186360 | 7/2007 |
| JP | A-A2007-249038 | 9/2007 |
| JP | A-2007-298667 | 11/2007 |
| JP | 2008-005027 | 1/2008 |
| JP | A-2008-507617 | 3/2008 |
| JP | 2008-129159 A | 6/2008 |

(56) References Cited

FOREIGN PATENT DOCUMENTS

| | | |
|---|---|---|
| JP | 2015-163991 A | 9/2015 |
| JP | 2015-187742 A | 10/2015 |
| KR | 2002-0030852 | 4/2002 |
| KR | 2005-0067162 A | 6/2005 |
| KR | 10-2007-0033920 A | 3/2007 |
| TW | 200704704 A | 2/2007 |
| TW | I395011 B | 5/2013 |
| WO | WO 2006/011461 A1 | 2/2006 |
| WO | WO 2006/129665 A1 | 12/2006 |
| WO | 2007/066590 A1 | 6/2007 |
| WO | WO 2007/063751 A1 | 6/2007 |
| WO | WO 2007/0066590 A1 | 6/2007 |
| WO | WO 2008/007800 | 1/2008 |
| WO | WO 2008/007800 A1 | 1/2008 |

OTHER PUBLICATIONS

Mar. 23, 2011 Notification of Reason(s) for Refusal for Japanese Patent Application No. 2008-105198 w/English translation.
WIPO Patentscope for WO 2008/007800.
Dec. 30, 2011 Submission of Publications and the Like issued in Japanese Application No. 2008-101101 with English-language translation.
Dec. 30, 2011 Submission of Publication sand the Like issued in Japanese Application No. 2008-100891 with English-language translation.
Sep. 19, 2007 Written Opinion of the International Preliminary Examining Authority for International Application No. PCT/JP2007/064120 (with translation).
Jan. 13, 2012 Submission of Publications and the like for Japanese Patent Application No. 2008-98342 (with translation).
Feb. 29, 2012 Notification of Reason(s) for Refusal for Japanese Patent Application No. 2008-105198 (with translation).
Mar. 21, 2012 Office Action issued in Japanese Patent Application No. 2008-185415 (with English-language translation).
Apr. 5, 2012 Office Action issued in European Application No. 07 790 882.0.
Feb. 20, 2012 Submission of Publications and the like issued in Japanese Patent Application No. 2008-101101 (with translation).
Feb. 20, 2012 Submission of Publications and the like issued in Japanese Patent Application No. 2008-100891 (with translation).
Mar. 28, 2012 Japanese Office Action issued in Japanese Patent Application No. 2012-048220 (with English Translation).
Mar. 28, 2012 Japanese Office Action issued in Japanese Patent Application No. 2008-096150 (with English Translation).
Office Action issued in Chinese Application No. 201110086455.6 dated Apr. 27, 2012 (with translation).
May 9, 2011 Japanese Submission of Publications and the like for Application No. 2008-105198 w/English translation.
"Liquefied Polyisoprene Rubber LIR," May 12, 2002.
Jun. 20, 2012 Office Action issued in Japanese Patent Application No. 2008-098342 (with translation).
Office Action issued in Taiwanese Patent Application No. 97101357 (with English Translation).
Office Action issued in Japanese Patent Application No. 2008-185415 (with English Translation).
Jul. 6, 2011 Japanese Submission of Publications and the like for Japanese Patent Application No. 2008-98342 (with Translation).
Jul. 11, 2011 Japanese Submission of Publications and the like for Japanese Patent Application No. 2008-105198 (with Translation).
Oct. 3, 2011 Japanese Submission of Publications and the like for Japanese Patent Application No. JP-2008-098342 (with Translation).
Dec. 13, 2011 Submission of Publications and the like for Japanese Application No. 2008-105198 with English-language translation.
Notifications of reasons for refusal dated Aug. 6, 2008 (drafting date) and Dec. 26, 2008 (drafting date), decision of refusal dated May 18, 2009 (drafting date), and Preliminary report dated Oct. 16, 2009 (Creation date), of Japanese Patent Application No. Hei. 11-038529.
The Committee of Kagaku Daijiten, eds., "Kagaku Daijiten 2", p. 375, Kyoritsu Shuppan Co., Ltd., Jul. 15, 2006; Akira Matsumura, ed., "Daijirin", p. 449, Sanseido Publishing Co., Ltd., Nov. 3, 1988; and the Committee of Shogakukan Daijisen, eds., "Daijisen", p. 492, Shogakukan Inc., Dec. 1, 1995 (documents on visible light).
Oct. 19, 2011 Chinese Office Action issued in Chinese Patent Application No. 200780026330.6 (with English-language Translation).
Nov. 21, 2012 Submission of Publications and the Like, issued in Japanese Application No. 2008-100891 (with English translation).
Feb. 20, 2013 Office Action issued in Japanese Application No. 2008-098342 (with English translation).
Oct. 25, 2012 Submission of Publications and the Like issued in Japanese Patent Application No. 2008-105198 (with English translation).
Oct. 25, 2012 Notification of Reasons for Refusal issued in Japanese Patent Application No. Hei 10-240922.
Dec. 10, 2012 Submission of Publications and the Like issued in Japanese Patent Application No. 2008-098342 (with English Translation).
Dec. 26, 2012 Office Action issued in Japanese Patent Application No. 2008-105198 (with English Translation).
Dec. 26, 2012 Office Action issued in Japanese Patent Application No. 2012-105372 (with English Translation).
Dec. 25, 2012 Office Action issued in Chinese Patent Application No. 201110086455.6 (with English translation).
Oct. 23, 2012 Japanese Submission of Publications and the Like issued in Japanese Patent Application No. 2008-098342 (with English Translation).
"Trial Decision" of Japanese Patent Application No. HEI 11-38529 (Dissatisfaction No. 2009-14917).
May 7, 2013 Office Action issued in Japanese Patent Application No. 2008-101983 (with translation).
May 7, 2013 Office Action issued in Japanese Patent Application No. 2008-100879 (with translation).
Aug. 30, 2013 Submission of Publications and the like issued in Japanese Application No. 2008-101101 (with English Translation).
May 9, 2013 Submission of Publications and the Like issued in Japanese Application No. 2008-105198 (with English translation).
Aug. 20, 2013 Korean Office Action issued in Application No. 10-2009-7000633 (with English translation).
Jul. 2, 2013 Notification of Reasons for Refusal issued in Japanese Application No. 2008-100891 (with English Translation).
Jul. 16, 2013 Notification of Reasons for Refusal issued in Japanese Application No. 2012-105372 (with English Translation).
Apr. 10, 2013 Notification of Reasons for Refusal issued in Japanese Application No. 2008-101101 (with English Translation).
Apr. 1, 2014 Decision to Dismiss the Amendment issued in Japanese Application No. 2008-101101 (with translation).
Apr. 1, 2014 Decision of Refusal issued in Japanese Application No. 2008-101101 (with translation).
Apr. 8, 2014 Submission of Publications and the like issued in Japanese Patent Application No. 2013-215621 (with English translation).
Nov. 6, 2013 Office Action issued in Japanese Application No. 2008-101101 (with English Translation).
Feb. 12, 2014 Office Action issued in Japanese Application No. 2013-089503 (with English Translation).
Jan. 2, 2014 Office Action issued in Korean Application No. 2013-7026158 (with English Translation).
Jul. 1, 2014 Notification of Reason(s) for Refusal issued in Japanese Application No. 2008-100891 with English-language translation.
Jan. 14, 2014 Office Action issued in Japanese Application No. 2012-181768 (with English translation).
Jul. 23, 2014 Submission of Publications and the like submitted in counterpart Japanese Patent Application No. 2012-181768 (with English translation).
Jul. 23, 2014 Submission of Publications and the like submitted in related Japanese Patent Application No. 2013-089503 (with English translation).
Jul. 30, 2014 Office Action issued in counterpart Chinese Patent Application No. 201110129612.7 (with English translation).
Aug. 28, 2014 Office Action issued in counterpart Korean Patent Application No. 2014-7013283 (with English translation).
Sep. 1, 2014 Office Action issued in counterpart Japanese Patent Application No. 2013-215621 (with English translation).

(56) References Cited

OTHER PUBLICATIONS

Aug. 27, 2014 Office Action issued in counterpart Korean Patent Application No. 2009-7021086 (with English translation).
Dec. 12, 2014 European Search Report issued in European Application No. 14002672.5.
Dec. 24, 2014 Notification of Reason(s) for Refusal issued in Japanese Application No. 2014-022038.
Dec. 2, 2014 First Office Action issued in Chinese Application No. 201310103458.5.
Dec. 16, 2013 Notice of Grounds for Rejection issued in Korean Application No. 2009-7020498.
Sep. 29, 2014 Notice of Final Rejection issued in Korean Application No. 2009-7020498.
Sep. 30, 2014 Notification of Reason(s) for Refusal issued in Japanese Application No. 2013-089503.
Sep. 30, 2014 Notification of Reason(s) for Refusal issued in Japanese Application No. 2012-181768.
Oct. 18, 2013 Notice of Grounds for Rejection issued in Korean Application No. 2013-7020373.
Oct. 28, 2014 Notice of Final Rejection issued in Korean Application No. 2013-7020373.
Nov. 11, 2014 Notification of Reason(s) for Refusal issued in Japanese Application No. 2014-018947.
Aug. 4, 2014 Office Action issued in Taiwanese Patent Application No. 102118596 (with English Translation).
Sep. 30, 2014 Notice of Grounds for Rejection issued in Korean Application No. 2009-7020757 with English-language translation.
May 19, 2015 Office Action issued in Japanese Application No. 2013-215621.
Jun. 4, 2015 Office Action issued in Korean Patent Application No. 2015-7008267.
Aug. 24, 2015 Office Action issued in Korean Application No. 2009-7021192.
Aug. 5, 2015 Office Action issued in Chinese Application No. 201310103458.5.
Feb. 15, 2015 Office Action issued in Chinese Application No. 201310056745.5.
Sep. 1, 2015 Office Action issued in Taiwanese Application No. 101130952.
Oct. 12, 2015 Office Action issued in European Application No. 08740127.9.
Oct. 12, 2015 Office Action issued in European Application No. 08740099.0.
Jul. 20, 2015 Communication issued in European Application No. 08 740 108.9.
May 21, 2015 Office Action issued in Taiwanese Application No. 103112478.
Jan. 15, 2015 Submission of Publications and the like issued in Japanese Application No. 2013-215621.
Jan. 21, 2015 Submission of Publication and the like issued in Japanese Application No. 2013-215621.
Feb. 26, 2015 Office Action issued in U.S. Appl. No. 14/331,660.
Feb. 3, 2015 Office Action issued in Taiwanese Application No. 101130952.
May 7, 2015 Office Action issued in Japanese Application No. 2014-132099.
Apr. 2, 2015 Office Action issued in Korean Application No. 2015-7001682.
Mar. 27, 2015 Office Action issued in Taiwanese Application No. 102112670.
Jun. 3, 2015 Office Action issued in Chinese Application No. 201310578940.4.
Jul. 13, 2015 Office Action issued in Taiwanese Application No. 102112670.
Oct. 27, 2015 Office Action issued in Chinese Application No. 201310056745.5.
Oct. 6, 2015 Office Action issued in European Application No. 11 009 604.7.
Oct. 22, 2015 Office Action issued in Chinese Application No. 201410025812.1.
Oct. 5, 2015 Office Action issued in European Application No. 08 778 217.3.
Jan. 15, 2016 Office Action issued in Chinese Application No. 201310328607.8.
Jan. 20, 2016 Office Action issued in Chinese Application No. 201310578940.4.
Feb. 26, 2016 Office Action issued in Korean Application No. 2015-7001682.
Mar. 1, 2016 Office Action issued in Japanese Application No. 2015-104305.
Mar. 1, 2016 Office Action issued in Japanese Application No. 2015-104375.
Mar. 15, 2016 Office Action issued in Japanese Application No. 2015-112377.
Apr. 5, 2016 Office Action issued in Japanese Application No. 2015-129846.
Apr. 21, 2016 Office Action issued in Chinese Application No. 201310103458.5.
May 11, 2016 Third Party Submission issued in Japanese Application No. 2015-161711.
May 11, 2016 Third Party Submission of Publications issued in Japanese Application No. 2015-161711.
Jul. 5, 2016 Office Action issued in Japanese Application No. 2015-161711.

* cited by examiner

1B

101

RESIN COMPOSITION AND DISPLAY UNIT

TECHNICAL FIELD

The present invention relates to an image display unit used, for example, in cellular phones. In particular, the invention relates to an image display unit that includes an image display part and a transparent protective part arranged on the image display part, with a cured resin arranged between the image display part and the protective part.

BACKGROUND ART

As this type of display unit, a liquid crystal display unit 101 as shown in FIG. 4 is known. The liquid crystal display unit 101 includes a liquid crystal display panel 102 and a transparent protective part 103 arranged on the liquid crystal display panel 102. The protective part 103 is made of, for example, glass or plastic.

To protect the surface of the liquid crystal display panel 102 and a polarizer (not shown), a spacer 104 is arranged between the liquid crystal display panel 102 and the protective part 103 to form a gap 105 between the liquid crystal display panel 102 and the protective part 103.

However, the gap 105 between the liquid crystal display panel 102 and the protective part 103 scatters light, resulting in decreased contrast and luminance of the display unit. The presence of the gap 105 also makes it difficult to design thinner display units.

To address these problems, it has been proposed to fill the gap between the liquid crystal display panel and the protective part with a resin (see, for example, Patent Document 1). However, the stress generated when the resin cures and shrinks causes the deformation of the liquid crystal display panel, resulting in disrupted orientation of the liquid crystal material and other image defects.

[Patent Document 1] Japanese Patent Application Laid-Open No. 2005-55641

DISCLOSURE OF THE INVENTION

Problems to be Solved by the Invention

The present invention has been devised in view of the above-described problems associated with prior art. Accordingly, it is an object of the present invention to provide a thin display unit that incorporates a high-luminance, high-contrast image display part that is free of image defects caused by the deformation of the display part.

Means for Solving the Problems

In an effort to achieve the foregoing object, the present inventors drew attention to the fact that the internal stress that builds up within a resin as the resin cures can be approximated by the product of the storage modulus and the cure shrinkage of the cured resin, and found an ideal resin composition for filling the above-described gap between the display part and the protective part of a display unit, that is, a resin composition that shrinks little when cured and has a storage modulus in a suitable range. This finding ultimately led to the present invention.

The present invention devised based on the above-described finding provides an image display unit that includes an image display part, a light-transmitting protective part arranged on the image display part, and a cured resin layer arranged between the image display part and the protective part. The cured resin layer has a transmittance of 90% or higher in the visible range and a storage modulus at 25° C. of $1\times10^7$ Pa or less.

The present invention also provides the cured resin layer arranged between the image display part and the light-transmitting protective part of the image display unit. As described above, the cured resin layer has a transmittance of 90% or higher in the visible range and a storage modulus at 25° C. of $1\times10^7$ Pa or less.

The present invention further provides a resin composition for forming the above-described cured resin layer. The resin composition has a cure shrinkage of 5% or less and its cured resin has a transmittance of 90% or higher in the visible range when formed into a 100 μm-thick layer. The cured resin also has a storage modulus at 25° C. of $1\times10^7$ Pa or less.

In the present invention, the image display part may be a liquid crystal display panel.

In the present invention, the protective part may be formed of an acrylic resin.

In the present invention, the protective part may also be formed of an optical glass.

Effect of the Invention

The resin composition of the present invention generates minimum shrinkage stress when it is applied between the image display part and the protective part and cured, so that the effects of the stress on the image display part and the protective part can be minimized. Thus, the image display part and the protective part of the image display unit of the present invention are substantially free of distortion.

Since the cured product of the resin composition of the present invention, namely the cured resin, has a refractive index closer to that of the panels used to make the image display part and the protective part, than does the gap between the liquid crystal display panel and the protective part, light reflection is suppressed at the interface between the protective part and the cured resin or at the interface between the cured resin and the image display part.

As a result, the image display unit of the present invention achieves high-luminance, high-contrast display of images without causing any image defects.

The image display unit of the present invention can effectively prevent the disrupted orientation of liquid crystal materials and other image defects and can therefore achieve high-quality display of images especially when the image display part is a liquid crystal display panel.

Furthermore, the presence of the cured resin between the image display part and the protective part reinforces the image display unit of the present invention, making it resistant to high impacts.

In addition, the present invention can provide image display units that are thinner than any of the conventional image display units that have a gap between the image display part and the protective part.

Figure 1:
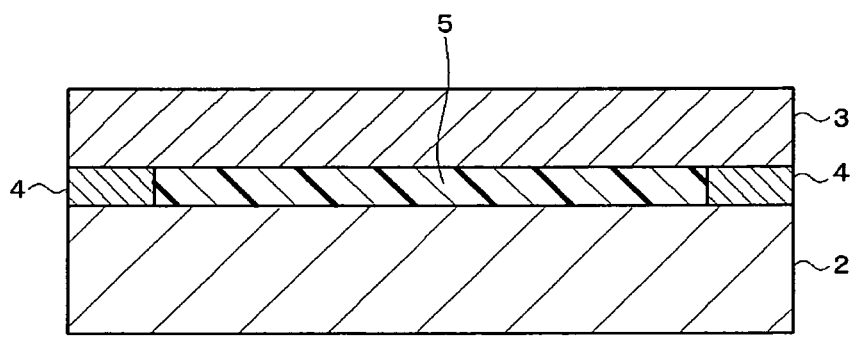
FIG. 1 is a cross-sectional view showing essential components of one embodiment of display unit according to the present invention.

DESCRIPTION OF REFERENCE NUMERALS 1, 1B display unit
2 display part
3 protective part
4 spacer
5 cured resin or cured resin layer
6, 7 polarizer

BEST MODE FOR CARRYING OUT THE INVENTION

Preferred embodiments of the present invention will now be described with reference to the accompanying drawings, in which the same numerals denote the same or similar elements.

Figure 2:
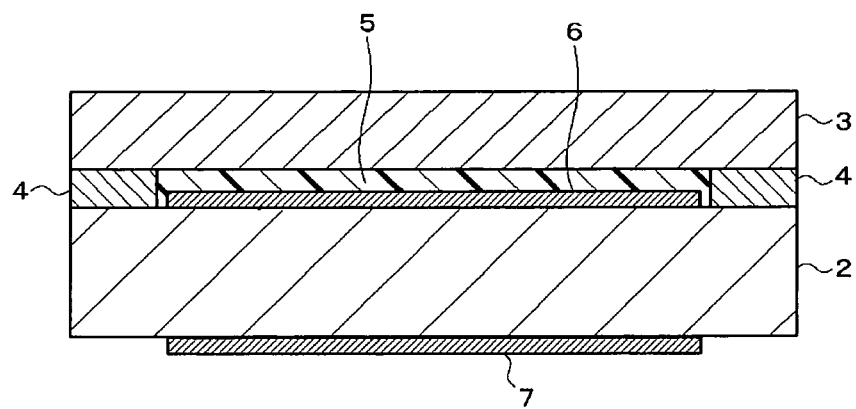
FIG. 2 is a cross-sectional view showing essential components of another embodiment of display unit according to the present invention.

FIGS. 1 and 2 are cross-sectional views each showing one embodiment of display unit according to the present invention.

With reference to FIG. 1, a display unit 1 of the present embodiment includes a display part 2 that is connected to a drive circuit (not shown) and displays predetermined images, and a light-transmitting protective part 3 that is arranged in the vicinity of the display part 2 and faces the display part 2.

In the display unit 1 of the present embodiment, the display part 2 is a liquid crystal display panel used in a liquid display apparatus.

The liquid crystal display apparatus is not limited to a particular type, but can be applied to various systems. Examples of such liquid crystal display apparatuses include those for use in cellular phones, portable game machines and other electronic devices.

When the display part 2 is a liquid-crystal display panel, polarizers 6, 7 are arranged on each side of the display part 2 as shown in FIG. 2.

The protective part 3 is formed of a planar member having substantially the same size as the display part 2. The protective part 3 is preferably formed of an optical glass or plastic (such as an acrylic resin).

The protective part 3 is spaced apart from the display part 2 by a spacer 4 arranged along the periphery of the display part 2. The thickness of the spacer is about in the range of from 0.05 mm to 1.5 mm and serves to keep the distance between the surfaces of the display part 2 and the protective part 3 at approximately 1 mm.

The display unit 1 includes a cured resin layer 5 provided between the display part 2 and the protective part 3.

In the present invention, the cured resin layer 5 has a transmittance of 90% or higher in the visible range and a storage modulus at 25° C. of $1 \times 10^7$ Pa or less, and preferably from $1.0 \times 10^3$ to $1.0 \times 10^6$ Pa. The resin composition to make the cured resin layer 5 has a cure shrinkage of 5% or less, preferably 4.5% or less, and more preferably from 0 to 2%.

Figure 3:
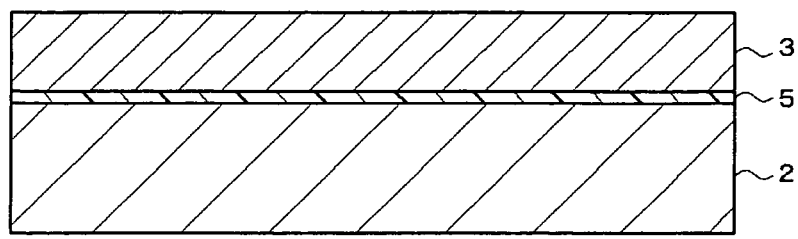
FIG. 3 is a cross-sectional view showing essential components of still another embodiment of display unit according to the present invention.

The image display unit of the present invention is preferably configured without using the spacer 4 used in the above-described embodiments of the display unit 1 shown in FIGS. 1 and 2. Specifically, the resin composition layer 5 and the protective part 3 are sequentially overlaid on the display part 2. Curing the resin composition completes an image display unit 1B as shown in FIG. 3 without providing the spacer. In this configuration, the distance between the display part 2 and the protective part 3 (thus, the thickness of the cured resins layer 5), which is determined by factors such as viscosity and density of the resin composition and weight of the protective part 3, is typically in the range of from 50 μm to 200 μm. Such a configuration therefore makes it possible to design thinner image display units.

In the present invention, the resin composition to make the cured resin layer 5 is preferably a photocurable resin composition in order to increase the productivity, although other resins may also be used.

The resin composition for use in the present invention preferably contains at least one polymer, such as polyurethane acrylates, polyisoprene acrylates and esters thereof, hydrogenated terpene resins or butadiene polymers; at least one acrylate monomer, such as isobornyl acrylate, dicyclopentenyloxyethyl methacrylate or 2-hydroxybutyl methacrylate; and at least one photopolymerization initiator, such as 1-hydroxy-cyclohexyl-phenyl-ketone.

Since the protective part 3 often has a UV-cutting function to protect the display part 2 against ultraviolet rays, the photopolymerization initiator for use in the present invention is preferably used together with a photopolymerization initiator that can cure in the visible range (such as SpeedCure TPO (trade name), Nihon Siber Hegner KK).

The resin composition for use in the present invention is prepared such that the cured resin obtained by curing the resin composition by UV irradiation has a storage modulus (at 25° C.) of $1 \times 10^7$ Pa or less, and preferably in the range of from $1 \times 10^3$ Pa to $1 \times 10^6$ Pa, has a refractive index preferably in the range of from 1.45 to 1.55, and more preferably in the range of from 1.51 to 1.52, and has a transmittance of 90% or higher in the visible range when formed into a 100 μm thick layer. Different resin compositions containing the same major resin component but different auxiliary resin components and monomer components may be cured to have different storage moduli (at 25° C.) that may, in some cases, exceed $1 \times 10^7$ Pa. Those resin compositions that are cured to have a storage modulus (at 25° C.) of higher than $1 \times 10^7$ Pa are not included in the scope of the present invention.

The resin composition of the present invention also has a preferable cure shrinkage of 5% or less, more preferably of 4.5% or less, and still more preferably in the range of from 0 to 2%. In this manner, the internal stress that builds up within the cured resin upon curing of the resin composition can be reduced, and the distortion generated at the interface between the cured resin layer 5 and the display part 2 or the protective part 3 can be prevented.

Thus, by arranging the resin composition between the display part 2 and the protective part 3 and then curing the resin composition, the amount of light scattered at the interface between the cured resin layer 5 and the display part 2 or the protective part 3 can be reduced. As a result, the luminance and the visibility of the displayed images can be improved.

The magnitude of the internal stress that builds up within the cured resin upon curing of the resin composition can be evaluated by dropping the resin composition onto a flat surface and measuring the average surface roughness of the flat surface. In practice, the distortion generated at the interface between the display part 2 or the protective part 3 and the cured resin arranged in between would be negligible if, for example, a cured resin obtained by dropping 2 mg of the resin composition onto a glass plate and cured by UV irradiation to 90% or a higher cure ratio results in the glass plate having an average surface roughness of 6 nm or less. By using the resin composition of the present invention, this average surface roughness of the glass plate can be kept at 6 nm or less, and preferably in the range of 1 nm to 3 nm.

To fabricate the display unit 1 of the present invention, the spacer 4 and a ridge (not shown) are arranged on the display part 2 along its periphery. A predetermined amount of the above-described photocurable resin composition is then poured over the display member 2 in the area inside the spacer and the ridge.

The protective part 3 is then placed on the display part 2 over the spacer 4 and the gap between the display part 2 and the protective part 3 is completely filled with the resin composition.

Subsequently, the resin composition is irradiated with ultraviolet rays via the protective part 3 to cure the resin composition. This completes the desired display unit 1.

When it is desired to fabricate the display unit 1B in which the spacer 4 is omitted, the above-described photocurable resin composition is first applied onto the display part 2. The protective part 3 is then placed over the coating of the resin composition and the ultraviolet rays are irradiated onto the resin composition from the side of the protective part 3.

In the image display units 1, 1B of the present invention obtained in the foregoing manner, the effects of the stress generated as the resin cures and shrinks on the display part 2 and the protective part 3 can be minimized, so that little or no distortion is generated in the display part 2 and the protective part 3. Since the display part 2 is not deformed during the production, it can display images at high luminance and high contrast without causing any image defects.

In addition, the cured resin 5 that fills the gap between the display part 2 and the protective part 3 in the present embodiment reinforces the display unit 1 so that it can withstand high impacts. This makes it possible to design thinner display units 1.

In particular, when the image display part 2 is a liquid crystal display panel, the present invention can provide a liquid crystal display apparatus that can effectively prevent disrupted orientation of liquid crystal materials and other image defects and can thus achieve high-quality display of images especially.

While the present invention is suitable for use in the above-described liquid crystal display apparatuses, the invention is also applicable to various other panel displays, such as organic EL apparatuses and plasma display apparatuses.

EXAMPLES

The present invention will now be described in detail with reference to Examples and Comparative Examples, which are not intended to limit the scope of the invention in any way.

Example 1

The following components were kneaded together in a kneader to make a resin composition of Example 1: 50 parts by weight of polyurethane acrylate, 30 parts by weight of isobornyl acrylate, 3 parts by weight of a photopolymerization initiator and 1 part by weight of a photopolymerization initiator for visible-range.

Example 2

The following components were kneaded together in a kneader to make a resin composition of Example 2: 70 parts by weight of an ester formed from a maleic anhydride adduct of a polyisoprene polymer and 2-hydroxyethyl methacrylate, 30 parts by weight of dicyclopentenyloxyethyl methacrylate, 10 parts by weight of 2-hydroxybutyl methacrylate, 30 parts by weight of a hydrogenated terpene resin, 140 parts by weight of a butadiene polymer, 4 parts by weight of a photopolymerization initiator and 0.5 parts by weight of a visible-range photopolymerization initiator.

Example 3

The following components were kneaded together in a kneader to make a resin composition of Example 3: 100 parts by weight of an ester formed from a maleic anhydride adduct of a polyisoprene polymer and 2-hydroxyethyl methacrylate, 30 parts by weight of dicyclopentenyloxyethyl methacrylate, 10 parts by weight of 2-hydroxybutyl methacrylate, 30 parts by weight of a hydrogenated terpene resin, 210 parts by weight of a butadiene polymer, 7 parts by weight of a photopolymerization initiator and 1.5 parts by weight of a visible-range photopolymerization initiator.

Comparative Example 1

The following components were kneaded together in a kneader to make a resin composition of Comparative Example 1: 50 parts by weight of polybutadiene acrylate, 20 parts by weight of hydroxyethyl methacrylate, 3 parts by weight of a photopolymerization initiator and 1 part by weight of a visible-range photopolymerization initiator.

Comparative Example 2

The following components were kneaded together in a kneader to make a resin composition of Comparative Example 2: 50 parts by weight of polyurethane acrylate, 30 parts by weight of tricyclodecane dimethanol acrylate, 3 parts by weight of a photopolymerization initiator and 1 part by weight of a visible-range photopolymerization initiator.

Comparative Example 3

The following components were kneaded together in a kneader to make a resin composition of Comparative Example 3: 50 parts by weight of polybutadiene acrylate, 20 parts by weight of isobornyl acrylate, 3 parts by weight of a photopolymerization initiator and 1 part by weight of a visible-range photopolymerization initiator.

Evaluation 1

Each of the resin compositions prepared in Examples 1 through 3 and Comparative Examples 1 through 3 was poured onto a 100 μm-thick white glass plate to a predetermined thickness. The plates were transported on a UV-conveyor to obtain cured resins having a predetermined thickness. The cured resins were used as samples.

The light transmittance, elastic modulus, cure shrinkage and surface roughness of each sample were determined as described below.

[Light Transmittance]

Using a UV-Visible spectrophotometer (V-560, Jasco Corp.), each sample (with 100 μm-thick cured resin) was analyzed for the transmittance in the visible range. It turned out that all of the samples had 90% or a higher transmittance.

[Elastic Modulus]

Using a viscoelastometer (DMS6100, Seiko Instruments Inc.), the elastic modulus (at 25° C.) of each sample (with 2 mm-thick cured resin) was measured at a frequency of 1 Hz.

[Cure Shrinkage]

The cure shrinkage of each sample was determined by the following equation using the difference in the specific gravity between the uncured resin solution and the cured solid product, as measured by an electronic specific gravity meter (SD-120L, Mirage Co.).

$$\text{cure shrinkage (\%)} = \{(\text{specific gravity of cured resin} - \text{specific gravity of resin solution})/(\text{specific gravity of cured resin})\} \times 100$$

[Surface Roughness]

Using a three-dimensional non-contact surface roughness meter (Zygo Corp.), each sample (with 1 mm-thick cured resin) was analyzed for the distortion (Ra: average surface roughness) in a predetermined area (2.93 mm×2.20 mm) of the glass plate surface caused by the internal stress generated during UV curing.

These results are shown in Table 1.

TABLE 1

Properties of Examples and Comparative Examples and corresponding evaluation results

|  | Elastic modulus (Pa) | Cure shrinkage (%) | Ra: average surface roughness (nm) |
|---|---|---|---|
| Example 1 | $1 \times 10^6$ | 4.5 | 5.5 |
| Example 2 | $1 \times 10^4$ | 1.8 | 2.7 |
| Example 3 | $4 \times 10^3$ | 1.0 | 1.5 |
| Comparative Example 1 | $2 \times 10^7$ | 5.6 | 12.4 |
| Comparative Example 2 | $3 \times 10^8$ | 4.3 | 36.5 |
| Comparative Example 3 | $5 \times 10^8$ | 5.6 | 64.2 |

As can be seen from Table 1, the average surface roughness Ra was from 1.5 nm to 5.5 nm in each of Examples 1 through 3, indicating that samples in these Examples were each distorted little.

In comparison, Ra was significantly large in each of Comparative Example 1 (Ra=12.4 nm), Comparative Example 2 (Ra=36.5 nm) and Comparative Example 3 (Ra=64.2 nm), suggesting that the internal stress generated upon curing of the resin in each of Comparative Examples 1 through 3 caused distortion at the interface between the resin and the glass plate.

Evaluation 2 [Impact Resistance]

The resin composition of Example 1 was cured between a 50 mm×50 mm×0.5 mm glass plate (display part) and a 50 mm×50 mm×0.5 mm polycarbonate plate (protective part) to form a 0.1 mm-thick layer between the two plates. The resulting panel served as the sample panel of Example. In this configuration, the spacer was omitted and the sample panel had a total thickness of 1.1 mm. To fabricate the sample panel, the resin composition of Example 1 was first applied to the glass plate and the polycarbonate plate was placed over the coating of the resin composition. The resin composition was then cured by the irradiation of UV from the side of the polycarbonate plate.

Figure 4:
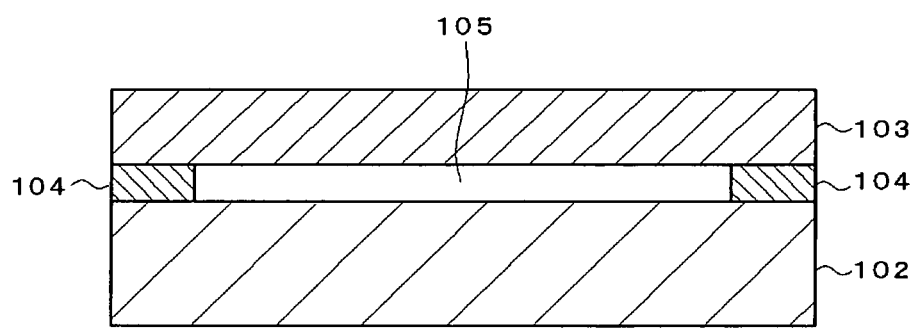
FIG. 4 is a cross-sectional view showing essential components of a conventional display unit.

Meanwhile, a sample panel having the conventional configuration as shown in FIG. 4 was prepared. The liquid crystal display panel (display part) 102 and the protective part 103 used were identical to those used to make the sample panel of Example. The display part and the protective part were assembled with 1.0 mm thick spacers arranged in between to make the sample panel of Comparative Example having a 1.0 mm air gap and a total thickness of 2.0 mm.

Each of the sample panels of Example and Comparative Example was secured to a mount by the periphery using a predetermined jig. A panel breakage test was then performed by perpendicularly pressing a press member, 5 mm in diameter, against the surface of the protective part at a press speed of 1 mm/sec.

The sample panel of Comparative Example with the air gap formed between the display part and the protective part broke at 1 N/cm$^2$, whereas the sample panel of the present invention broke at 1.43 N/cm$^2$.

The results demonstrate that the panel of Example has a press strength that is 43% higher than that of the panel of Comparative Example, yet has a decreased thickness as compared to the panel of Comparative Example.

The invention claimed is:

1. An image display unit comprising:
an image display part;
a light-transmitting protective part arranged on the image display part; and
a cured resin layer arranged between the image display part and the protective part,
wherein:
the cured resin layer is formed of a photocurable resin composition comprising:
at least one polymer selected from the group consisting of polyurethane acrylate, polyisoprene acrylate, ester of polyisoprene acrylate, hydrogenated terpine resin, and butadiene polymer;
at least one acrylate monomer selected from the group consisting of isobornyl acrylate, dicyclopentenyloxyethyl methacrylate, and 2-hydroxybutyl methacrylate; and
at least one photopolymerization initiator;
the cured resin layer has:
a transmittance of 90% or higher in the visible range,
a storage modulus at 25° C. of $1 \times 10^7$ Pa or less, and
a cure shrinkage of 0 to 2.0%; and
curing of the resin composition imparts an average surface roughness of 6 nm or less to a surface of the protective part or a surface of the image display part.

2. The image display unit according to claim 1, wherein the at least one photopolymerization initiator comprises a photopolymerization initiator for the visible range together with a photopolymerization initiator for the ultraviolet range.

3. The image display unit according to claim 1, wherein the cured resin layer has a thickness of from 50 μm to 200 μm.

4. The image display unit according to claim 1, wherein the image display part is a liquid crystal display panel.

5. The image display unit according to claim 1, wherein the protective part is formed of an acrylic resin.

6. The image display unit according to claim 1, wherein the protective part is formed of an optical glass.

7. The image display unit according to claim 1, wherein the storage modulus at 25° C. of the cured resin layer is in a range of from $1 \times 10^3$ to $1 \times 10^{6}$ Pa.

8. A method of producing an image display unit comprising an image display part, a light-transmitting protective part arranged on the image display part, and a cured resin layer arranged between the image display part and the protective part, comprising:
providing a photocurable resin composition between the image display part and the protective part, the photocurable resin composition comprising:
a butadiene polymer,
at least one acrylate monomer selected from the group consisting of isobornyl acrylate, dicyclopentenyloxyethyl methacrylate, and 2-hydroxybutyl methacrylate, and
a photopolymerization initiator for curing the at least one acrylate monomer, the photopolymerization initiator including a photopolymerization initiator for the visible range together with a photopolymerization initiator for the ultraviolet range; and
irradiating the photocurable resin composition with ultraviolet rays to cure the photocurable resin composition, thereby forming the cured resin layer having a transmittance of 90% or higher in the visible range, a storage modulus at 25° C. of from $1 \times 10^3$ to $1 \times 10^6$ Pa, and a cure shrinkage of 0 to 2.0%;

wherein curing of the resin composition imparts an average surface roughness of 6 nm or less to a surface of the image display part or a surface of the protective part.

* * * * *